INVENTORS.
MAURITS TEN BOSCH
PAUL LANG
BY
ATTORNEY

United States Patent Office 2,983,150
Patented May 9, 1961

2,983,150

NON-TUMBLING GYROSCOPE UNIT

Maurits Ten Bosch, White Plains, and Paul Lang, Katonch, N.Y., assignors to M. Ten Bosch, Inc., Pleasantville, N.Y., a corporation of New York Filed July 7, 1958, Ser. No. 746,855

10 Claims. (Cl. 74—5.2)

The present invention relates to a non-tumbling vertical gyroscope system.

Although the present invention is not limited thereto, it will be particularly described in its application to the use of gyroscope systems and control device and particularly in fire control devices which will be effective in airborne craft and especially during aerial combat maneuvers such as, dive bombing, loft bombing, including the "over the shoulder method" of release and air-to-air combat.

It is among the objects of the present invention to provide a control gyroscope system, which will be effective during violent aerial combat maneuvers, such as, dive bombing, loft bombing and air-to-air combat and which will reliably give an accurate measurement of vertical direction during serial combat techniques and throughout violent twists, turns and other maneuvers of the aircraft, particularly in arcuate or circular maneuvers in vertical planes.

Another object is to provide a small, compact, reliable non-tumbling gyroscope system which will determine vertical direction to a high degree of accuracy in spite of repeated and violent maneuvers of the aircraft.

Another object of the present invention is to provide a novel compact small size reliable non-tumbling gyroscope control unit particularly designed for aircraft which will eliminate any tendency for gimbal lock and which will permit ready, effective control operation of the gyroscope without restriction on the pitch or roll of the aircraft.

Still further objects and advantages will appear in the more detailed description set forth below, it being understood, however, that this more detailed description is given by way of illustration and explanation only and not by way of limitation, since various changes may be made by those skilled in the art without departing from the scope and spirit of the present invention.

In accomplishing the above objects it has been found most desirable to use a single gyroscope rotor unit with a vertical spin axis and with the housing for the rotor constituting the inside platform or inside roll gimbal.

The housing in turn is mounted by the inner roll axis upon the intermediate pitch gimbal. The intermediate pitch gimbal is in turn mounted by the pitch axes transverse to the inner roll axis upon the outer roll gimbal.

The outer roll gimbal will be mounted by the longitudinal roll axis upon the aircraft structure with said longitudinal roll axis being aligned with and parallel with the longitudinal aircraft axis.

In operation the transversely extending inner roll axis between the housing and the pitch gimbal and the intermediate pitch axis between the pitch gimbal and the outer roll gimbal are always kept in the same horizontal plane.

Associated with the outer roll gimbal may be an accelerometer desirably positioned under the outer roll gimbal bearings with its axis perpendicular to the outer roll axis and parallel to the pitch axis and with another accelerometer positioned on top of the rotor spin axis with its axis being parallel to the tilting axis of the gyroscope and perpendicular to the pitch gimbal axis.

Essentially the housing and the inside roll gimbal are a single unit and they both move together in respect to the intermediate pitch gimbal which in turn may move in respect to the outside roll gimbal which last-mentioned is joined to the vehicle or aircraft structure.

The error signal between the inside roll gimbal or housing and the intermediate pitch gimbal creates a force to compel the axes of the inside roll gimbal and the intermediate pitch gimbal to stay in the same horizontal plane.

In operation, the inner roll axis and the intermediate pitch axis will always be kept in the same horizontal plane or in a plane which will be perpendicular to the vertical to the earth.

In connection with the integrating accelerometers if the housing drifts out of the horizontal, the accelerometers will provide error signal torques to precess or erect the platform or housing back into a horizontal plane.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denot corresponding parts throughout the several views.

Figure 1:
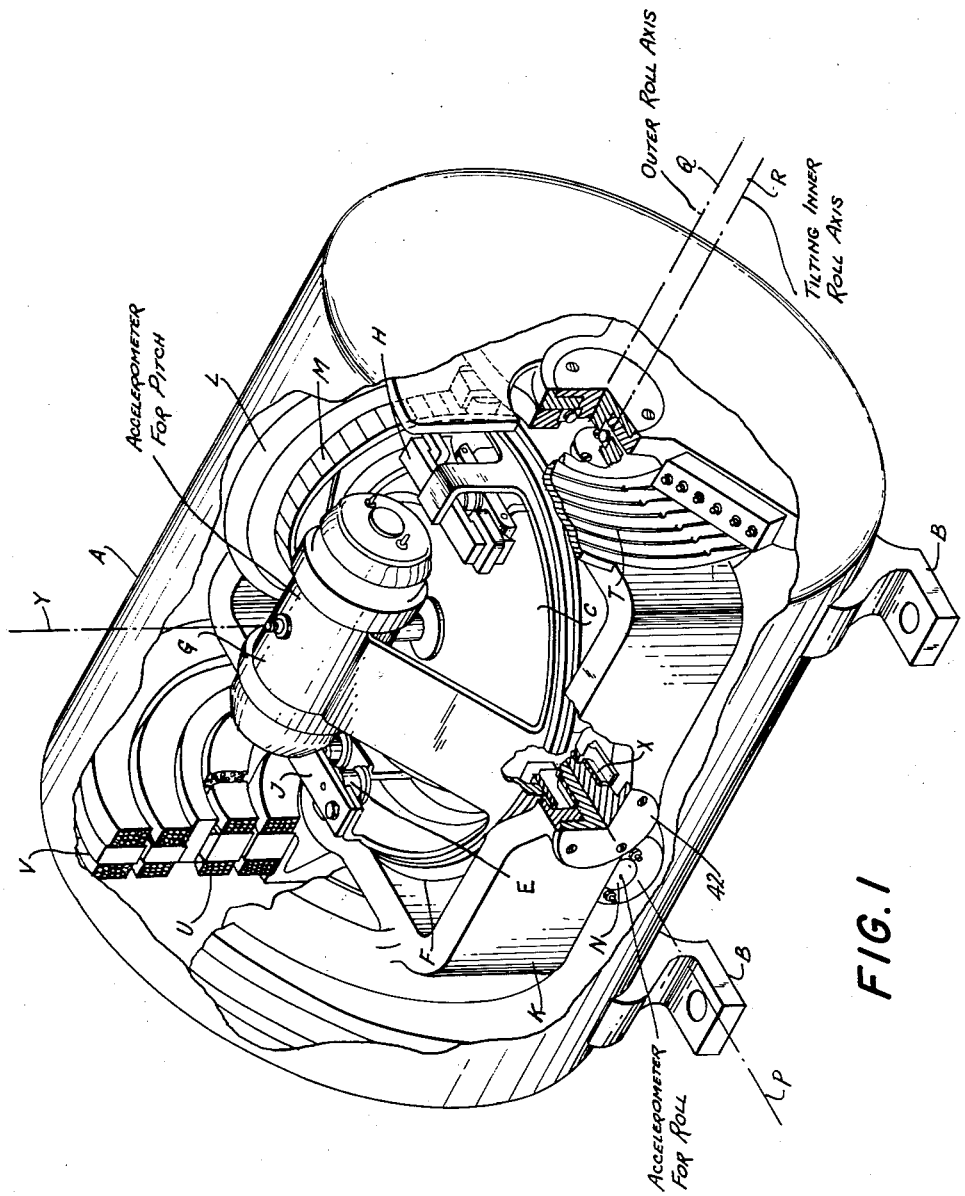
Figure 1 is a perspective view in partial section of one form of a non-tumbling vertical gyroscope according to the present invention using only one rotor and showing the outside casing partly broken away to show the internal arrangement of parts.

In Fig. 1, the inside platform and the inside roll gimbal C are formed by the rotor housing itself.

Referring to Fig. 1 the housing C of the rotor which rotor has the spin axis Y carries the pitch erection accelerometer G.

The housing is mounted by the inner roll axis upon the pitch gimbal F.

As shown at each side of the pitch gimbal are the roll pick-off J and the pitch erection torquer H.

The tilting action roll erection torquer M, together with the pitch synchro L are located to one side of the housing C. The outer roll gimbal K carries the roll erection accelerometer N.

As indicated at the right of Fig. 1 the outer roll gimbal axis and the tilting inner roll axis will be parallel and perpendicular to the pitch axis P indicated at the left of Fig. 1.

Figure 2:
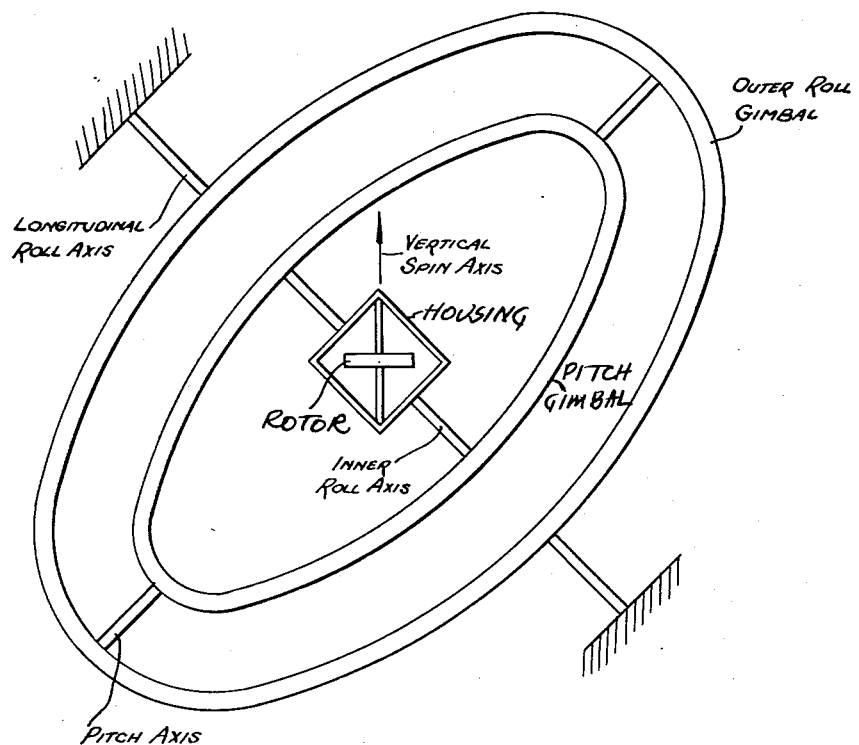
Fig. 2 is a diagrammatic perspective view indicating the arrangement of the rotor, housing and pitch and roll gimbals.

The outside gimbal K is mounted on the main frame by ball bearings; the electric leads are brought across the axis by brushes and slip rings, indicated at T in Figs. 1 and 2.

On the main frame or housing, as shown in Fig. 1, are mounted the roll synchro U, the roll servo V and the slip rings at T (see Fig. 1).

The housing or cover A will maintain the entire unit hermetically sealed.

In the arrangement shown in Fig. 1, the bearing friction and electrical lead torques will be maintained at very low levels about the sensitive axes with the use of miniature ball bearings on the tilting and pitch axis mountings, holding the bearing friction to very small limits.

The hair spring leads on the electrical connections positioned at X may be adjusted to zero reaction torque when all of the axes are mutually perpendicular.

In the case of the tilting axis, the deviation about the axis will be very small so that the torque developed in the deflection of the springs will be negligible.

About the pitch axis, the torques developed by the hair springs X will be linearly proportional to the angular deflection and can be easily balanced by applying a compensating torque from the roll erection torquer M as a function of the angular deviation indicated by the pitch synchro.

The vertical spin axis is indicated at Y in Fig. 1.

The feet B enable mounting of the unit as shown in Fig. 1 upon a convenient base structure.

The diagrammatic sketch in Fig. 2 illustrates the arrangement of the various parts. It will be noted that the housing of the rotor, said rotor having a vertical spin axis, will be directly mounted upon the inner roll axis with the housing serving as a platform.

This housing will be carried by the inner roll axis upon the pitch gimbal.

The pitch gimbal in turn will be carried by the pitch axis on the outer roll gimbal with the inner roll axis being transverse to the pitch axis.

On top of the rotor housing will be mounted the accelerometer G as shown in Fig. 1 for pitch while the roll accelerometer N will be mounted transversely to the pitch accelerometer and below and on the outer roll gimbal so that the pitch accelerometer will move with the housing while the roll accelerometer will move with the outer roll gimbal.

In this arrangement the pitch accelerometer will have its axis parallel to the tilting axis of the gyroscope or perpendicular to the pitch gimbal axis. On the other hand the roll accelerometer will have its axis perpendicular to the outer roll axis and parallel to the pitch axis.

The error signal between the housing and the pitch gimbal will assure the non-tumbling feature and both the pitch axis and inner roll axis will always be maintained in the same horizontal plane.

It is thus apparent that the present invention has provided a most effective non-tumbling vertical gyroscope unit connected to the aircraft by a three-axis gimbal system which will assure that the gyroscope spin axes will always be maintained in vertical direction regardless of the violent maneuver of the aircraft during dive bombing, loft bombing and air-to-air combat.

There will be an elimination of any gimbal lock and the gyroscope will operate without tumbling throughout most violent, pitching, rolling or acrobatic movements of the aircraft.

To summarize the present gyroscope system has a single spinning rotor with a housing carrying the rotor, a pitch gimbal carrying the housing and a roll gimbal carrying the pitch gimbal with a final structure rigid with the vehicle carrying the roll gimbal.

The maximum effectiveness of the control system is when the longitudinal axis of the vehicle approaches or becomes coincidental with the vertical spin axis of the gyroscope in steep dives.

With the normal gyroscope there is nothing which prevents a tumbling effect, with the result that the gyroscope will be 180 degrees or a multiple of 180 degrees out of line and thus lose its control function.

The present gyroscope, however, has an anti-tumbling control which prevents such an out-of-line position.

With the present gyroscope arrangement, when the longitudinal axis of the vehicle approaches or becomes coincidental with the vertical spin axis of the gyroscope, the take-up control signal will cause motion around the outer roll axis so that there will be sufficient motion to reduce the error signal to zero.

The most important effect achieved by the present arrangement is that the error signal created between the inner roll gimbal and the pitch gimbal keeps the pitch axis and the inner roll axis in a horizontal plane.

The housing and inside roll gimbal for the rotor are joined together and may move with respect to the pitch gimbal which in turn may move in respect to the outside roll gimbal, which in turn is joined to the vehicle structure.

The error signal between the inside roll gimbal and the intermediate pitch gimbal creates a force to compel the axes of the inside roll gimbal and the intermediate pitch gimbal to stay in the same horizontal plane.

Thus the inner roll axis and the pitch axis always stay in the same horizontal plane or a plane perpendicular to the vertical to the earth.

In the one rotor system of Figure 1, the housing for the single vertical spin rotor is directly mounted on the pitch gimbal and an error signal is measured between the housing and the pitch gimbal which movement is upon the inner roll axis.

The pitch gimbal in turn is mounted by the pitch axis on the outer roll gimbal, the pitch axis connecting the pitch gimbal and the outer roll gimbal being perpendicular to the inner roll axis.

The control system will keep the inner roll axis and the pitch axis in the same horizontal plane.

Then the axis connecting the outer roll gimbal to the aircraft will be parallel to the aircraft roll axis extending longitudinally of the aircraft.

The outputs of the unit of the present invention are synchro signals for roll angle and pitch angle with the pitch angle being defined as the angle between the fore and aft axis of the aircraft and a horizontal plane and the roll angle being defined as the angle between the Y-axis of the aircraft and the vertical plane through the fore and aft axis.

The unit as described may have the following specifications:

Gyroscope rotor:
    Speed _____ 24,000 r.p.m.
    Angular momentum __ $2.8 \times 10_6$ gm.-cm./sec.$^2$.
    Voltage _____ 115 v., 3 phase, 400 c.p.s.

Freedom of axes:
    Gyro rotor tilting_____ ±20°.
    Pitch gimbal _____ ±110°.
    Outer roll gimbal _____ unlimited.

Dimensions:
    Vertical gyroscope unit_____ 4"×4"×4½".
    Amplifier unit_____ 4"×4"×2½".

Weight:
    Vertical gyroscope unit_____ 4¼ lb.
    Amplifier unit _____ ¾ lb.

Volume:
    Vertical gyroscope unit_____ 56½ in.$^3$.
    Amplifier unit _____ 36 in.$^3$.

Environmental conditions:
    Ambient temperature _____ 54° C. to +100° C.
    Altitude _____ unlimited.
    Aircraft maneuvers _____ unlimited freedom.

The gyroscope utilizes a synchronous speed rotor having an angular momentum of $2.85 \times 10^6$ gm.-cm.$^2$/sec. The rotor is constructed to minimize mass shift due to thermal effects and is also hermetically sealed.

In the arrangement shown there are provided miniature ball bearings which support the rotor housing in the pitch gimbal F while the gyro power leads will be in the nature of very fine hair springs located at X.

The pitch gimbal F consists of a thin wall spherical shell with stiffening flanges and its material will be selected to match the thermal expansion of the rotor housing in order to prevent balance changes about the sensitive axes due to temperature variations. Besides supporting the rotor housing C, this gimbal F also supports the pitch erection accelerometer G, the pitch pickoff torquer H, and the pickoff for roll servo operation J. The suspension of this bimbal in the outer roll gimbal K and the crossing of the axis with electrical leads is treated similarly to that of the gyro housing tilting axis R.

On the outer roll gimbal K are mounted the pitch synchro L, the roll erection torquer M, and the roll accelerometer N. As in the case of the pitch gimbal F, the material of this gimbal will be selected to properly compensate for thermal effects along the pitch axis P. This gimbal K is mounted on the main frame by means of ball bearings and the electrical leads are brought across the axis by means of brushes and slip rings T.

To the main frame are attached the roll synchro U, the roll servo V, and the slip rings T. The entire unit will be enclosed by an hermetically sealed cover A.

As is normal in the case of free gyros, the bearing friction and electrical lead torques must be maintained at very low levels about the sensitive axes. In this design, the use of miniature ball bearings on the tilting and pitch axes will hold the bearing friction within the limits required by the specifications.

The hair-spring leads at X can be adjusted to zero reaction torque when all of the axes are mutually perpendicular.

In the case of the tilting axis R, the deviation about the axis will be very small so that the torque developed in the deflection of the springs will be negligible. About the pitch axis, the torques developed by the hairsprings X will be linearly proportional to the angular deflection and can be easily balanced by applying a compensating torque from the roll erection torquer M as a function of the angular deviation indicated by the pitch synchro L.

The pick-off which is mounted on the pitch gimbal F will sense deviation of perpendicularity of the pitch axis P to the gyro spin axis Y about the tilt axis R. A signal voltage resulting from such deviation will pass to the roll servo V which then will cause the servo to rotate the roll gimbal K and pitch gimbal F to restore the desired perpendicularity. Hence, if the gyro spin axis Y is vertical, the pitch axis P will be maintained at all times in a horizontal plane. This maintains the proper references for the measurement of pitch and roll while maintaining the vertical for all possible maneuvers of the aircraft.

The accelerometers G and N serve to erect the gyroscope and to maintain the verticality of the spin axis Y and have an acceleration sensing threshold of .004 g and they do not possess any inherent natural frequency. These accelerometers G and N are mounted with their sensing axes in the horizontal plane and perpendicular to the axes about which they will control the erection.

In the initial erection mode, the gyroscope is first positioned to an approximate vertical by erecting the spin axis Y to a pre-established angular relationship to the frame by use of the output voltages of the synchros U and L tied into the erection circuits.

Following this, the accelerometers are switched into the circuits to complete the erection. Since the gyro rotor will be at a relatively low speed and stronger than normal signals are applied to the torquers M and H, the erection will be very rapid.

A time delay relay will then switch the system to the normal erection mode.

Deviation of an accelerometer axis from the horizontal plane because of gyro drift will produce a signal which will operate the proper erection torquer through a amplifier to precess the gyro to the vertical and also level the accelerometer.

With some increase in size and weight of the amplifier unit and a speed input, the erection rate can be made dependent upon maneuvering rates such that the gyro will not erect to false gravity verticals.

While there has been herein described a preferred form of the invention, it should be understood that the same may be altered in details and in relative arrangement of parts within the scope of the appended claims.

Having now particularly described and ascertained the nature of the invention, and in what manner the same is to be performed:

What is claimed is:

1. A gyroscope system with a vertical spin axis, said system indicating deviation of the vehicle in pitch and roll, said system being of the type having a spinning gyroscope rotor and a housing enclosing said rotor, a pitch gimbal carrying said housing and a control gimbal carrying the pitch gimbal and a controlled arrangement to maintain the axes connecting the pitch gimbal with the housing and the pitch gimbal with the roll gimbal in a horizontal plane at all times and accelerometers positioned above and below said housing with their axes extending horizontally and being at right angles to each other, and erection torquers actuated by the outputs of the accelerometers to effect erection of the housing in a horizontal plane.

2. A gyroscope system with a vertical spin axis, said system indicating deviation of the vehicle in pitch and roll, said system being of the type having a spinning gyroscope rotor and a housing enclosing said rotor, an intermediate pitch gimbal and an outside roll gimbal, and a restoring arrangement actuated by deviation of the connecting axes from the horizontal to restore said axes to the horizontal and accelerometers positioned above and below said housing with their axes extending horizontally and being at right angles to each other, and erection torquers actuated by the outputs of the accelerometers to effect erection of the housing in a horizontal plane.

3. A gyroscope system of the type having a spinning rotor and a housing carrying said rotor, a pitch gimbal carrying the housing and a roll gimbal carrying the pitch gimbal and a structure rigid with the vehicle carrying the roll gimbal and error signal controlled means to maintain the connecting gimbal axes in a horizontal plane and accelerometers positioned above and below said housing with their axes extending horizontally and being at right angles to each other, and erection torquers actuated by the outputs of the accelerometers to effect erection of the housing in a horizontal plane.

4. A vehicle gyroscope system having a rotor with a vertical spin axis, a housing carrying said rotor and bearings for the ends of said spin axis, a pitch gimbal carrying said housing, a roll gimbal carrying said pitch gimbel, and a carrying structure mounted on the vehicle carrying said roll gimbal means actuated by tendency of the vertical spin axis to deviate from the vertical spin axis to drive said gimbal to correct said deviation and accelerometers positioned above and below said housing with their axes extending horizontally and being at right angles to each other, and erection torquers actuated by the outputs of the accelerometers to effect erection of the housing in a horizontal plane.

5. A vehicle gyroscope system having a rotor with a vertical spin axis, a housing carrying said rotor and bearings for the ends of said spin axis, a pitch gimbal carrying said housing, a roll gimbal carrying said pitch gimbal, and a carrying structure mounted on the vehicle carrying said roll gimbal means creating an error signal actuated by tendency of the vertical spin axis to deviate from the vertical and means to oppose the deviation from the vertical actuated by said error signal to reduce the error signal to zero and accelerometers positioned above and below said housing with their axes extending horizontally and being at right angles to each other, and erection torquers actuated by the outputs of the accelerometers to effect erection of the housing in a horizontal plane.

6. An anti-tumbling gyroscope system having a pitch gimbal and a roll gimbal, respectively provided with a pitch axis and a roll axis and means to maintain said axes on the same horizontal plane including means to create an error signal upon deviation from said horizontal plane and means to rotate the outer roll gimbal about the vehicle roll axis and the pitch gimbal about the vertical axis until the pitch axis is again in a horizontal plane and accelerometers positioned above and below said housing with their axes extending horizontally and being at right angles to each other, and erection torquers actuated by the outputs of the accelerometers to effect erection of the housing in a horizontal plane.

7. A non-tumbling gyroscope unit for aircraft having a single gyroscope with a vertical spin axis with a rotor and a housing and the housing constituting the inside platform and inside roll gimbal, an intermediate pitch gimbal upon which the housing is rotatably mounted upon an inner roll axis, an outer roll gimbal upon which the intermediate pitch gimbal is rotatably mounted upon transverse pitch axes, said outer roll gimbal being mounted upon a longitudinal roll axis upon the aircraft and accelerometers positioned above and below said housing with their axes extending horizontally and being at right angles to each other, and erection torquers actuated by the outputs of the accelerometers to effect erection of the housing in a horizontal plane.

8. The unit of claim 7, an accelerometer being positioned on the underside of the outer roll gimbal with its axis perpendicular to the outer roll axis and a second accelerometer positioned on the pitch gimbal with its axis perpendicular to the pitch axis and erection torquers actuated by said accelerometers.

9. A non-tumbling gyroscope arrangement with inner and outer longitudinal roll axes and an intermediate pitch axis and having a single gyroscope rotor unit with a vertical spin axis and a rotor housing constituting an inside platform and roll gimbal, an encircling intermediate pitch gimbal, upon which intermediate gimbal said housing is mounted on the inner roll axis, an outer roll gimbal encircling said housing and intermediate pitch gimbal, said outer gimbal carrying said intermediate gimbal upon the pitch axis and an outer mounting for the outer roll gimbal upon the vehicle by a longitudinal outer roll axis and pitch and roll accelerometers mounted horizontally at right angles to each other above and below said housing and erection torquers actuated by the outputs of the accelerometers to maintain the axes in a horizontal plane.

10. The arrangement of claim 9, the roll accelerometer being positioned on the underside of the outer roll gimbal and the pitch accelerometer being positioned on the pitch gimbal.

References Cited in the file of this patent
UNITED STATES PATENTS

| | | |
|---|---|---|
| 2,584,876 | Haskins | Feb. 5, 1952 |
| 2,595,951 | Konet et al. | May 6, 1952 |
| 2,802,364 | Gievers | Aug. 13, 1957 |